Jan. 1, 1946.   W. H. SILVER   2,392,006
DISK TILLER
Filed June 2, 1943   2 Sheets-Sheet 1

INVENTOR
WALTER H. SILVER
BY
ATTORNEYS

Jan. 1, 1946.  W. H. SILVER  2,392,006
DISK TILLER
Filed June 2, 1943  2 Sheets-Sheet 2
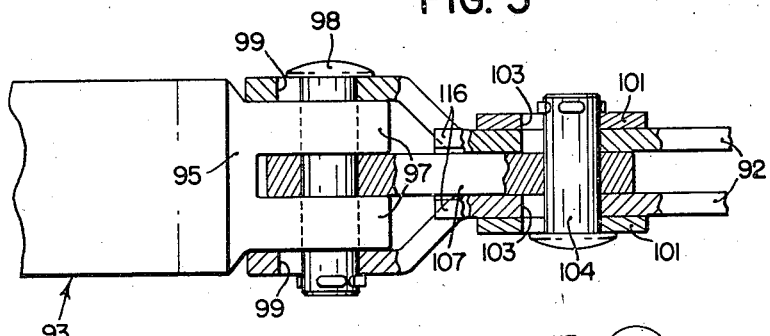
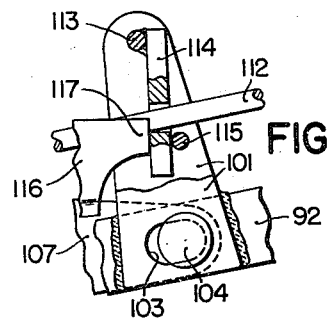
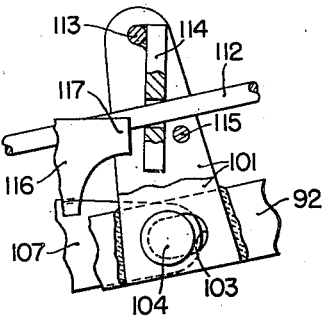
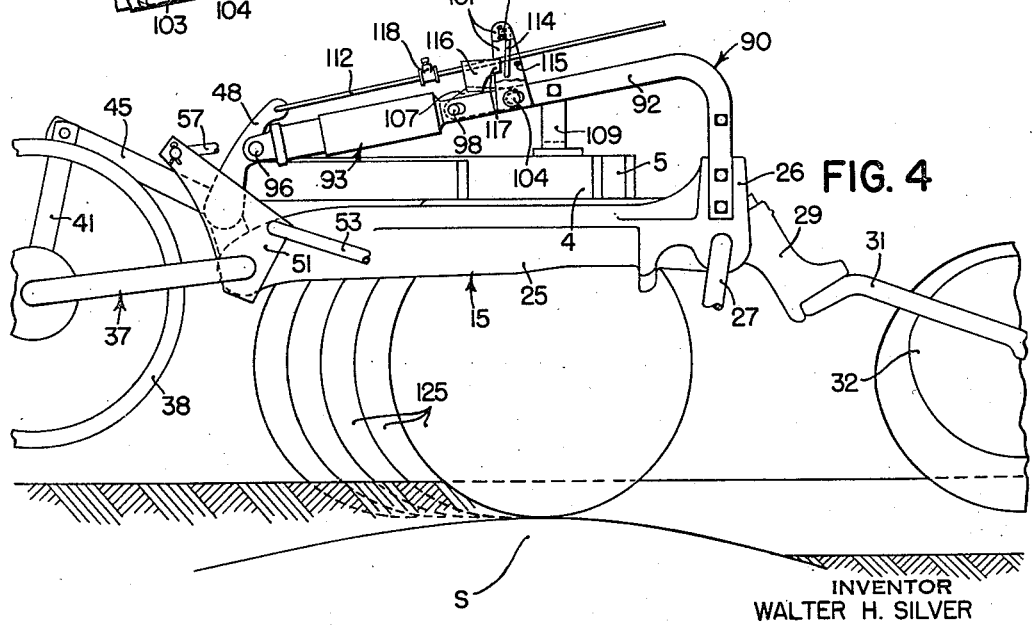
INVENTOR
WALTER H. SILVER
ATTORNEYS Patented Jan. 1, 1946

2,392,006

UNITED STATES PATENT OFFICE 2,392,006

DISK TILLER

Walter H. Silver, Moline, Ill., assignor to Deere & Company, Moline, Ill., a corporation of Illinois Application June 2, 1943, Serial No. 489,582

18 Claims. (Cl. 97—53)

The present invention relates generally to agricultural implements and more particularly to implements known as disk tillers.

The object and general nature of the present invention is the provision of lifting and controlling mechanism which is so constructed and arranged as to add the weight of one or more of the ground wheels to the implement frame in the event the latter is forced out of the ground, as may occur when the disks strike a hard spot, thereby aiding in maintaining the disks at or near the desired operating depth, irrespective of variations in the soil.

More specifically, it is a feature of this invention to provide a disk tiller or similar implement having generally vertically shiftable wheel means with releasable latch mechanism acting normally to hold the ground wheel or wheels against downward movement relative to the frame when the implement is in operating position but which does not interfere with the proper action of the lifting mechanism when lifting the frame relative to the ground wheels. Particularly, it is a feature of this invention to provide a hydraulic type of lift having a lost motion connection, movement of the lift through said lost motion connection serving first to release the latch whereupon subsequent extension of the power lift is enabled freely to lift the frame and associated tool means into a transport position.

These and other objects and advantages of the present invention will be apparent to those skilled in the art after a consideration of the following detailed description, taken in conjunction with the accompanying drawings in which the preferred structure has been illustrated.

In the drawings:

Figure 3 is a sectional view showing details of the connection between the hydraulic ram and certain of the wheel holding latch parts.

Figure 4 is a view similar to Figure 2, showing the operation of the latching mechanism in adding the weight of the wheels to the frame in the event a hard spot in the soil or other obstruction tends to force the tools out of the ground.

Figures 5 and 6 are fragmentary views illustrating the latched and released position of the latching mechanism.

Figure 1:
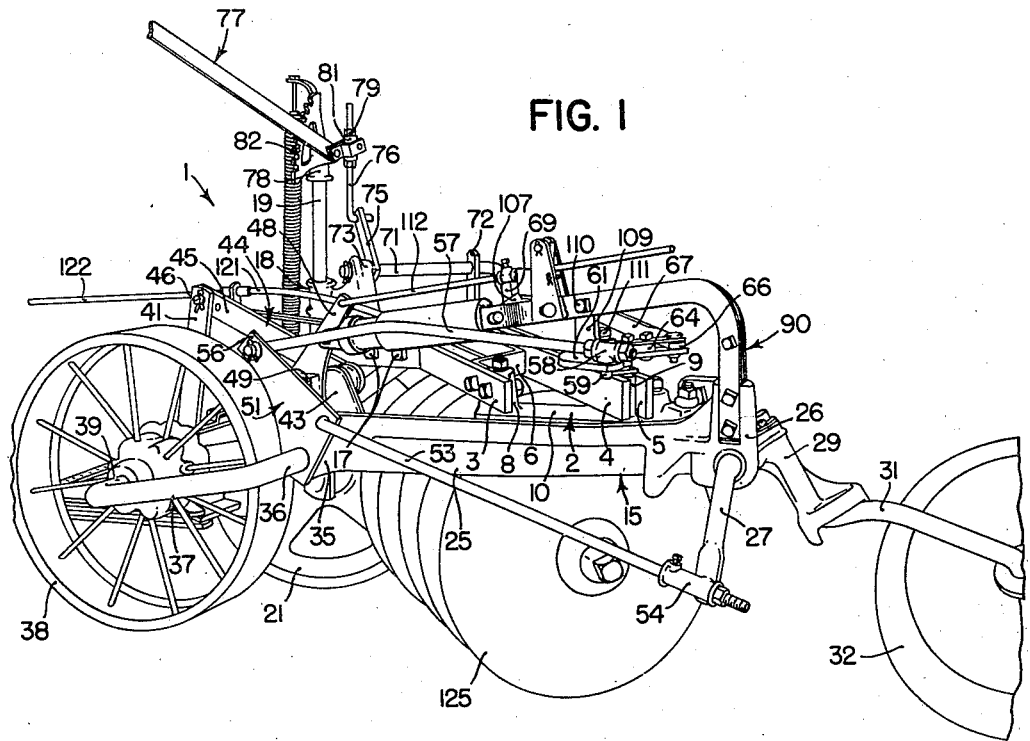
Figure 1 is a perspective view of a disk tiller in which the principles of the present invention have been incorporated.

Referring now more particularly to Figure 1, the implement chosen to illustrate the principles of the present invention is a disk tiller, indicated in its entirety by the reference numeral 1, which is similar to the tillage implement shown in my prior United States Patent No. 1,885,955, dated November 1, 1932. Only so much of the disk tiller 1 as is necessary to a complete understanding of the present invention has been illustrated in the drawings, reference being had to my prior patent mentioned above for further details of the implement. Generally, the disk tiller 1 includes a frame 2 that is made up of generally parallel members 3, 4 and 5 that extend diagonally, together with suitable braces 6. The rear ends of the diagonal bars 3, 4 and 5 are bolted to lugs 8 and 9 that are carried by or formed on a frame bolster plate 10 which is adjustably connected to a rear truck 15 for movement relative thereto about a vertical pivot (not shown). The front ends of the frame bars 3, 4 and 5 are bolted, as at 17, to a front furrow wheel sleeve casting 18 in which a front furrow wheel spindle 19 is vertically shiftable. A front furrow wheel 21 is journaled on the lower outturned end of the spindle 19.

The rear truck 15 includes a land and rear axle bearing 25 in the form of a relatively heavy casting or similar member formed at its rear end with a bearing section 26 in which a rear axle lift crank 27 is disposed. The horizontal portion of the crank axle 27 receives a rear axle sleeve member 29 in which a rear furrow wheel crank axle 31 is disposed for generally lateral swinging in at least one direction. The rear end of the crank axle 31 receives a furrow wheel 32, and rocking the crank axle 27 serves to raise and lower the rear end of the frame relative to the rear furrow wheel. At the front end the land and rear axle bearing 25 is formed with a forward bearing section 35 in which the rear horizontal section 36 of a forward land wheel crank axle 37 is disposed. A land wheel 38 is journaled on the forward portion of the land wheel crank axle 37. The forward end of the crank axle 37, indicated at 39, on which the wheel 38 is journaled, extends laterally inwardly through the hub of the wheel 38 and receives the lower end of a link 41 to which reference will be made below. The land and rear axle bearing member 25 is provided with a sleeve extension 43 adjacent but above the bearing section 35, and journaled in this extension 43 is a bell crank member 44 having one arm 45 thereof extending generally forwardly and pivoted, as at 46, to the upper end of the link 41, the latter being provided with two or more openings to provide for adjusting the relation between these parts as may be desired. The other portion of the bell crank member 44 includes a second arm 48, preferably having a hub section 49 which fits on the squared end of the journal portion of the arm 48 that is carried in the extension 43. Thus, rocking movement of the bell crank member 44 will act through the link 41 to shift the position of the land wheel 38 generally vertically relative to the frame 2 or, in other words, will raise or lower the frame relative to the wheel 38 which normally engages the ground. The journal section 36 of the land wheel crank axle 37 carries a crank arm 51 which is apertured to receive the forward end of a link 53, the rear end of which is adjustably fixed to a pivot casting 54 that is pivoted to the lower end of the furrow wheel crank axle 27. By virtue of the link 53 and associated parts the furrow wheel 32 and the land wheel 38 are caused to swing generally vertically together relative to the frame 2.

The land wheel 38 is also connected with the front furrow wheel 21 whereby the latter wheel is also adjusted vertically relative to the frame 2 whenever the other wheels are adjusted. The arm 51 includes an upper section 56 which is apertured to receive the forward end of a longitudinally extending link 57, the rear end of which is adjustably fixed to a pivot casting 58 pivoted, as at 59, to the laterally outer end of a bell crank member 61 journaled for rocking movement in a horizontal plane on the frame 2. The horizontal bell crank 61 includes a second arm 64 to which the rear end 66 of a generally diagonally extending link 67 is pivoted. The forward end of the link 67 extends forwardly and downwardly, as at 68, and is pivoted to the lower end of an arm 69 that is formed on or carried by a rockshaft 71 that is supported for rocking movement in a bracket 72 fixed to the forward end of the bars 4 and 5 and in a second bracket 73 that is formed on the front furrow wheel casting 18. An arm 75 is fixed to the rockshaft 71 and is connected by a link 76 to a hand lever 77 pivotally mounted on a combined cap and sector member 78. The upper end of the rod member 76 is threaded and receives pairs of lock nuts 79 disposed on opposite sides of a bushing 81 swiveled in the forward end of the hand lever 77. The hand lever 77 may be latched in different positions to the sector 82 of the member 78 and when shifted serves to adjust the position of the front end of the frame 2 relative to the front furrow wheel 21.

Figure 2:
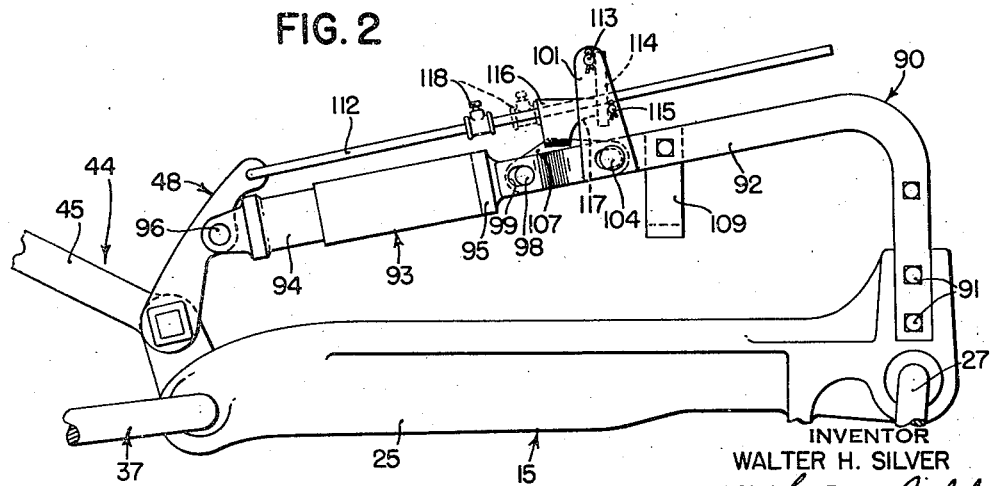
Figure 2 is a side view of the lifting and latching mechanism, the parts being shown in the positions they occupy when the implement has been lowered into operating or ground working position.

The present invention is more particularly concerned with the provision of improved lifting mechanism, and referring now to Figures 1 and 2, a generally L-shaped anchoring bracket 90 is bolted, as at 91, to the rear end of the land and rear axle bearing 25 and includes a section 92 extending generally forwardly. A ram unit 93, comprising a cylinder 94 and a piston member 95, is pivotally connected, as at 96, to the arm 48, and at its rear end the unit 93 is connected with the anchoring standard or bracket 90 in a particular manner which will now be described. The piston member 95 is formed with a pair of apertured ears 97 that receives a pin 98. The forwardmost ends of the two strap members making up the bracket 90 are provided with slots 99 which receive the pin 98 and accommodate a limited amount of lost motion. The structure just described provides a lost motion anchoring connection between said supporting bracket 90 and the rear end of the ram unit 93. A pair of bracket arms 101 are welded or otherwise fixed to the straps 90, and the lower portions of the bracket arms 101 as well as the adjacent portions of the anchoring straps 90 are provided with additional slots 103 in which a second pin 104 is disposed for limited relative movement. A link 107 is apertured to snugly receive both of the pins 98 and 104. The forwardly bent sections 92 of the straps 90 are supported rigidly by means of an angle bracket 109 which is bolted, as at 110, to the anchoring bracket 90 and at 111 to the stationary stud on the frame 2 that rockably receives the horizontal bell crank 61.

The upper end of the arm 48 is apertured to receive the forward end of a latch rod 112 that extends generally rearwardly between and beyond the two bracket arms 101. The upper ends of the bracket arms are apertured to receive a pivot pin 113 to which a latch detent 114 is secured, as by welding or the like. The latch detent 114 is apertured and the rear portion of the latch rod 112 passes therethrough. The bracket arms 101 also receive a stop pin 115 that limits the rearward swinging of the latch detent 114. A pair of abutment lugs 116, one on each side of the rod 112, are welded or otherwise fixed at their lower ends to the link 107, and each abutment lug includes a rearwardly extending section, as indicated at 117, that is adapted to engage the latch detent 114. A set screw collar 118 is adapted to be fixed to the rod 112 in any one of several different positions and that cooperates with the abutment lugs 116 and associated parts for limiting the rearward movement of the upper end of the arm 48, as will be explained below in detail. Fluid under pressure is directed to the power cylinder, or ram unit 93, through a flexible hose 121 and a conduit 122. It will be understood that the present invention is particularly adapted for use with a farm tractor of the type having a source of fluid pressure and suitable valve mechanism controlling the flow of fluid to and from the power unit on the tractor.

The operation of the invention as so far described is substantially as follows. The implement is lowered into operating position, in which the disks 125 work the ground, by releasing the fluid in the power unit 93 and permitting the fluid to flow freely back to the tractor or other reservoir through the power line 121, 122. The weight of the frame and disks normally is sufficient to cause the disks 125 to enter the ground, the rear furrow wheel 32, front furrow wheel 21 and land wheel 38 moving upwardly, relative to the frame, under the action of gravity acting on the frame and disks. The upward movement of the land wheel 38 acts through the link 41 to rock the bell crank member 44 generally in a clockwise direction, as viewed in Figures 2 and 4, thus forcing fluid out of the cylinder 94 and, at the same time, thrusting the latch rod 112 rearwardly. This movement of the rod 112 relative to the detent 114 is relatively free, since the detent 114 is so constructed that, when the detent is up against the rod 115, movement of the rod 112 is not resisted (Figure 5). This is the normal operating position, as shown in Figure 1, and may be determined by either of two ways. In the first place, the amount of fluid that is permitted to be evacuated from the cylinder 94 may be limited; in other words, by hydraulically locking a quantity of fluid in the cylinder 94, the amount of retracting movement of the unit 93 may be limited. Assuming that this is the case, the weight of the frame and associated parts tending to cause clockwise rotation of the crank axle 37 and the bell crank member 44, will shift the unit 93 to the right, Figure 2, until the pins 98 and 104 come up against the rear ends of the slots 99 and 103, respectively, in the standard 90. Thus, the unit 93, being connected between the arm 48 and the standard 90, resists any further upward movement of the land wheel 36, and since the other wheels are interconnected therewith, further lowering of the implement relative to its supporting wheels is terminated. The link 107, which moves with the pins 98 and 104 (see Figure 3), carries the abutment lugs 116 and the sections 117 thereof bring the latch detent 114 up against the stop pin 115 (Figure 5) and, in effect, hold the latch 114 in a position in which it is not effective against restraining movement of the latch rod 112. Assume, however, that, with the parts in the positions just described, the disks 125 strike a hard spot (S, Figure 4) and this tends to raise the frame 2 upwardly. As soon as the weight of the frame 2 and associated parts is removed from the land wheel 38, any further lifting on the frame 2 above this position results in the wheel 36 and crank axle 37 tending to fall downwardly relative to the frame 2, in a counterclockwise direction. This tends to cause the arm 48 to swing also in a counterclockwise direction so that it no longer acts through the power unit 93 to hold the link 107 in a rear position against the detent 114. Instead, the tendency for the arm 48 to swing forwardly will not only relieve the pressure of the abutment lugs 116 against the detent 114 but will shift the lugs 116 a slight distance away from the detent, as is illustrated in Figure 4. From this figure it will be seen that as soon as the lugs 116 leave the detent, the latter becomes free to swing in a clockwise direction, and to clamp against the rod 112 by virtue of the angular movement of the detent 114. The parts are so arranged that the greater the tendency for the rod 112 to be drawn forwardly the greater the holding power of the latch detent 114. Therefore, the arrangement is such that the tendency for the land wheel 38 to swing downwardly as the frame 2 is forced upwardly is effectively restrained due to the arrangement of the parts and also due to the fact that the power unit 93 contains only the fluid that was directed thereto, therefore when the arm 40 swings forwardly the power unit 93 moves idly therewith and is not forcibly extended. Since both the front furrow wheel 21 and the rear furrow wheel 32 are interconnected with the land wheel through the linkages described above, not only is the weight of the land wheel 38 added to the frame in the event the latter tends to be forced out of the ground during operation, but also the weight of the other wheels is added. This additional weight is normally effective to prevent the disks from being forced out of the ground when they strike a hard spot in the ground.

When it is desired to raise the disks to their transport position, all that it is necessary to do is to direct fluid under pressure back to the power unit 93. The fluid pressure first extends the unit 93 an amount which is sufficient to take up the lost motion provided by the slots 99 and 101, 103. This initial movement, which is power actuated, causes the link 107 to be shifted to the right (Figure 2) and forces the detent 114 into its inoperative position against the stop pin 115. After this takes place, and so long as the detent 114 is held in the position shown in Figure 5, the latch rod 112 is free to move forwardly and follow the arm 48 as the latter is swung in a counterclockwise direction by the extension of the power cylinder 93. The rod 112 therefore constitutes a member that moves with the land wheel and which is latched normally so as to add the weight of the land wheel, with the other wheels, to the implement in the event the latter is forced out of the ground during operation, but the application of lifting power to the cylinder 93 results in rendering the holding means inactive, as by first forcing the detent 114 against the stop pin 115, whereupon the lifting mechanism is then operative to raise the frame and associated tools clear of the ground and into their transport position.

Reference was made above to the fact that one means for determining the operating depth was to permit the right amount of fluid to be locked hydraulically in the cylinder 94. The same result may be secured by disposing the set screw collar 118 in such a position on the rod 112 that, when the tools are lowered into the desired position, the set screw collar 118 engages the abutments 116. Since the rod 112 moves through a greater range than the cylinder 94, since the latter is connected to the arm 48 at a point closer to the axis of the bell crank 44, the set screw collar 118 engaging the abutment lugs 116, may serve as a stop for limiting the lowering of the tools. If desired, the stop 118 may be so disposed as to define the lower limit, any intermediate operating position of the tools being determined by the control valve of the hydraulic system which includes the ram unit 93.

While I have shown and described above the preferred structure in which the principles of the present invention have been incorporated, it is to be understood that my invention is not to be limited to the particular details shown and described above but that, in fact, widely different means may be employed in the practice of the broader aspects of my invention.

What I claim, therefore, and desire to secure by Letters Patent is:

1. In an agricultural implement of the type including frame means, ground working tool means carried thereby, and generally vertically shiftable ground engaging wheel means supporting said frame means and adapted to be raised and lowered relative to the latter for lowering and raising said tool means relative to the ground, the combination of mechanism connected to act between said frame means and one of said shiftable supporting means for holding the latter in an upper position relative to the frame means so as to load onto the latter the weight of said support means in the event an obstruction or the like tends to force the tool means out of the ground and raise said frame means upwardly beyond a normal operating position, lifting mechanism connected to act between said frame means and said ground engaging supporting means for forcing the latter downwardly relative to the frame means for lifting the latter and the tool means into a transport position, and means whereby said holding means is rendered inoperative when said lifting mechanism is actuated.

2. The invention set forth in claim 1, further characterized by said holding means being rendered inactive before the frame means is raised to any substantial extent.

3. The invention set forth in claim 1, further characterized by said holding mechanism comprising a positive acting latch and said lifting means comprising mechanism reacting against said latch for releasing the same before raising said frame means.

4. In a disk tiller comprising a rear truck, a crank axle journaled thereon, and releasable latch means connected between said rear truck and said crank axle for holding said crank axle against movement in one direction, the combination therewith of means for shifting said crank axle in said one direction, and means connected with said shifting means and operable by movement thereof for releasing said latch means.

5. In an agricultural implement, a ground engaging support, a frame carrying a ground working tool movable relative thereto, power operated means for raising said frame relative to said support so as to elevate said tool, latch means connected between said support and said frame and operative to hold the support against down movement relative to said frame, and mechanism controlled by said power means for releasing said latch means so as to accommodate downward movement of said support relative to said frame.

6. In an agricultural implement, a ground engaging support, a frame carrying a ground working tool movable therewith, releasable latch means connected between said support and said frame for holding said support against downward movement relative to said frame and thus holding said tool in ground engaging relation, power operated means for raising said frame relative to said support so as to raise said tool out of engagement with the ground, and means actuated by initial movement of said power operated means for releasing said latch means before said power means raises said frame so as to accommodate downward movement of said support relative to said frame.

7. In a disk tiller, a frame, a crank axle pivoted to said frame, a ground wheel journaled on said crank axle, an arm fixed to said crank axle, a power cylinder connected at one end with said arm, lost motion means anchoring the other end of said cylinder to said frame, latch means normally active to prevent downward swinging of said crank axle relative to said frame, and a connection between said cylinder and said latch means for releasing the latter by the movement of said cylinder when taking up said lost motion.

8. In a disk tiller having a rear truck, a crank axle journaled for rocking movement at the forward end of said truck, a standard fixed to the rear end of said truck, an arm fixed to said crank axle, and a power operated ram unit connected between said standard and said arm for swinging said crank axle.

9. An agricultural implement comprising frame means, a pair of generally vertically shiftable supporting wheels therefor, a part movably mounted on said frame means and connected with said wheels for shifting them, holding mechanism arranged normally to act between said part and said frame means for holding both of said wheels in an upper position relative to said frame means, mechanism for forcing both of said wheels generally downwardly relative to said frame means for raising the latter relative to the ground, and means whereby said holding means is rendered inactive by the operation of said lifting means.

10. A disk tiller comprising a generally diagonal frame bar, a rear truck connected to the rear end of said frame bar and including a pair of generally vertically shiftable ground engaging wheels, a generally vertically shiftable ground engaging wheel at the forward end of said diagonal frame bar, means interconnecting all of said wheels whereby they may be raised and lowered together relative to said frame means for lowering and raising the latter, holding mechanism associated with one of said wheels for holding the latter against downward movement relative to said frame means whereby, if the latter should be forced by abnormal conditions out of the ground, the weight of all of said wheels will be added to the frame to resist upward movement of the latter under such conditions, lifting means for forcing said wheels downwardly relative to said frame means to raise the latter, and means taking the reaction of said lifting means for first rendering said holding means inactive.

11. An agricultural implement comprising frame means, a wheel carrying crank axle journaled for rocking movement relative to said frame means, a shiftable member connected with said crank axle for forcing the wheel downwardly relative to said frame means to raise the latter, means establishing a latching connection between said shiftable member and said frame and arranged normally to prevent said wheel from moving downwardly relative to said frame means, lifting mechanism connected with said member and having a lost motion connection with said frame means, and means actuated by movement of said lifting mechanism relative to said frame means through said lost motion connection for releasing said latching connection.

12. In an agricultural machine, a support, a part movable relative thereto, a member movable with said part, a latch movably carried by said support means and normally engageable with said member to prevent movement of said part in one direction, a power cylinder connected at one end with said part and adapted when extended to shift the latter in said one direction, a lost motion anchoring connection between the other end of said power cylinder and said support, a part carried by said other end of said power cylinder and engageable with said latch during movement of said power cylinder to take up said lost motion so as to shift the latch into an inactive position whenever power is applied to extend said power cylinder, and adjustable means cooperating with said member and said anchoring means for limiting movement of said part in the other direction.

13. A disk tiller comprising frame means including a rear truck, a crank axle swingably connected therewith, a swingable arm connected to swing said crank axle, an anchoring standard fixed to said truck, a power cylinder connected between said anchoring standard and said swingable arm for shifting said crank axle in one direction, and stop means acting between said swingable arm and said anchoring standard for limiting the movement of said crank axle in the other direction.

14. A disk tiller comprising frame means including a truck, a standard fixed thereto, a crank axle swingably connected with said truck, a swingable arm connected to swing said crank axle, a rod member pivoted at one end with said swingable arm and shiftable at the other end rearwardly relative to said standard when said crank axle swings upwardly relative to said frame means, and an adjustable stop on said rod member arranged when moved rearwardly with said rod member to bear against said standard for limiting the swinging movement of said crank axle upwardly relative to said frame means.

15. A disk tiller comprising frame means including a truck, a standard fixed thereto, a crank axle swingably connected with said truck, a swingable arm connected to swing said crank axle, a rod member pivoted at one end with said swingable arm and shiftable at the other end relative to said standard, an adjustable stop on said rod member arranged to bear against said standard for limiting the swinging movement of said crank axle in one direction, latch means acting between said rod member and said standard for releasably holding said crank axle against movement in the other direction.

16. A disk tiller comprising frame means including a truck, a standard fixed thereto, a crank axle swingably connected with said truck, a swingable arm connected to swing said crank axle, a rod member pivoted at one end with said swingable arm and shiftable at the other end relative to said standard, an adjustable stop on said rod member arranged to bear against said standard for limiting the swinging movement of said crank axle in one direction, latch means acting between said rod member and said standard for releasably holding said crank axle against movement in the other direction, and lifting means acting between said standard and said swingable arm for shifting said crank axle in said other direction after said latch has been released.

17. In a disk tiller or the like, a generally longitudinally extending wheel-carrying member, including a crank axle at its forward end swingably connecting the forward wheel with said member, a generally diagonally extending main frame to the rear end portion of which said wheel-carrying member is movably connected, a part movably mounted on the rear portion of said main frame, a standard fixed to the rear end of said member and including an upwardly and forwardly disposed section extending generally toward the front end of said member, a part pivotally mounted on the front end of said member generally laterally outwardly of the vertical plane of said standard and operatively connected to swing said crank axle, link means connected between said movable part and said pivotally mounted part and extending therebetween generally underneath the forwardly extending section of said standard, the forwardly extending section of said standard extending above and forwardly of the rear portion of said main frame and the part movably mounted thereon, and a ram unit connected at its rear end with said forwardly extending section of said standard and at its forward end with said swingably mounted part and operative to swing the latter and said movable part.

18. In a disk tiller or the like, a main frame, a wheel-carrying member, means including a stationary part for pivotally connecting said wheel-carrying member for horizontal adjustment with said main frame, front and rear wheels swingably connected with said member, a bracket fixed at its rear end to the rear end of said member and including an upwardly and forwardly extending section extending generally forwardly relative to said member and clearing the adjacent portions of said horizontally adjustable main frame, bracing means for the forwardly extending section of said bracket extending between the latter and said stationary part, and a power operated ram unit connected at its rear end with the forwardly extending portion of said bracket and said front wheel for adjusting the latter by power.

WALTER H. SILVER.